(12) United States Patent
Chida et al.

(10) Patent No.: US 9,186,751 B2
(45) Date of Patent: Nov. 17, 2015

(54) LASER IRRADIATION APPARATUS AND LASER IRRADIATION METHOD

(75) Inventors: Itaru Chida, Kawasaki (JP); Keiichi Hirota, Yokohama (JP); Hidekazu Sasaki, Kawasaki (JP); Takuya Uehara, Yokohama (JP); Tomoki Suetake, Kawasaki (JP); Hiroshi Nomura, Kooriyama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 371 days.

(21) Appl. No.: 13/529,793

(22) Filed: Jun. 21, 2012

(65) Prior Publication Data
US 2012/0325790 A1    Dec. 27, 2012

(30) Foreign Application Priority Data
Jun. 22, 2011    (JP) ................................ P2011-138603

(51) Int. Cl.
*B23K 26/12*    (2014.01)
*B23K 26/14*    (2014.01)
*B23K 26/10*    (2006.01)

(52) U.S. Cl.
CPC ............. *B23K 26/123* (2013.01); *B23K 26/106* (2013.01); *B23K 26/126* (2013.01); *B23K 26/1417* (2013.01); *B23K 26/1476* (2013.01)

(58) Field of Classification Search
CPC ............. B23K 26/123; B23K 26/1476; B23K 26/1417; B23K 26/126
USPC ............. 219/121.63, 121.64, 121.74, 121.78, 219/121.82, 121.83, 121.84
See application file for complete search history.

(56) References Cited

U.S. PATENT DOCUMENTS 5,066,846 A * 11/1991 Pirl ........................... 219/121.63
5,097,110 A *  3/1992 Hamada et al. ........... 219/121.63
(Continued)

FOREIGN PATENT DOCUMENTS

JP    1-122690    5/1989
JP    A H03-099787    8/1989
(Continued)

OTHER PUBLICATIONS

Notice of Invitation for the Opinion issued by the Korean Intellectual Property Office on Aug. 2, 2013, for Korean Patent Application No. 10-2012-0061918, and English-language translation thereof.
Japanese Patent Office, Notice of Reasons for Refusal in Application JP2011-138603, mailed Feb. 10, 2015, 3 pages.

*Primary Examiner* — Thien S Tran
(74) *Attorney, Agent, or Firm* — Finnegan, Henderson, Farabow, Garrett & Dunner, L.L.P.

(57) ABSTRACT

A laser irradiation apparatus of the embodiment includes: a laser light transmission mechanism to guide laser light from a laser light source and emit the laser light from a laser light emission part; a condensing mechanism to condense the laser light; a pipe state casing to house and hold the condensing mechanism inside thereof and have an opening part to irradiate the laser light; a fluid supply mechanism to supply a fluid into the casing to emit the fluid from the opening part; a positioning mechanism provided at the casing to keep a distance from the condensing mechanism to the processing object constant by being brought into contact with the processing object; and a fluid guide mechanism to guide the fluid emitted from the opening part to flow between the casing and the processing object along an axial direction of the casing.

9 Claims, 7 Drawing Sheets

(56) References Cited

U.S. PATENT DOCUMENTS

| | | | |
|---|---|---|---|
| 5,227,605 A | | 7/1993 | Boudot et al. |
| 5,728,992 A | * | 3/1998 | Swidwa ................... 219/121.64 |
| 5,981,901 A | * | 11/1999 | La Rocca ................. 219/121.63 |
| 6,528,761 B1 | | 3/2003 | Roos et al. |
| 8,431,859 B2 | | 4/2013 | Sasaki et al. |
| 2004/0238504 A1 | * | 12/2004 | Aubry et al. ............. 219/121.63 |

FOREIGN PATENT DOCUMENTS

| | | |
|---|---|---|
| JP | A H07-040071 | 10/1995 |
| JP | A 2002-515343 | 5/2002 |
| JP | 2005-313191 | 11/2005 |
| JP | 2011-6789 | 1/2011 |
| KR | 2000-0075724 | 12/2000 |
| WO | WO 98/38002 | 9/1998 |

* cited by examiner

LASER IRRADIATION APPARATUS AND LASER IRRADIATION METHOD

CROSS-REFERENCE TO RELATED APPLICATION

This application is based upon and claims the benefit of priority from the prior Japanese Patent Application No. 2011-138603, filed on Jun. 22, 2011; the entire contents of which are incorporated herein by reference.

FIELD

Embodiments described herein relate generally to a laser irradiation apparatus and a laser irradiation method.

BACKGROUND

For example, an apparatus is known in which an irradiation apparatus having an optical fiber housing pipe housing an optical fiber guiding laser light from a pulse laser light source to emit from a laser light emission part and a mirror housing pipe provided at a tip portion of the optical fiber housing pipe housing a reflection mirror having an aspherical shaped reflection surface disposed with a predetermined distance from the laser light emission part inside thereof and provided with a laser irradiation window to irradiate reflected laser light to an irradiation point at a circumferential surface thereof; a liquid feed means feeding cleaning liquid to the irradiation point of the laser light; and a moving apparatus moving the irradiation apparatus in an axial direction are included.

According to this apparatus, the laser light emitted from the optical fiber is reflected by the aspherical reflection mirror to be condensed and irradiated to an application surface, and therefore, it is not necessary to house a condenser lens to condense the laser light in the irradiation apparatus, and an outside diameter of the irradiation apparatus can be made thin for the extent. Besides, the aspherical mirror housing pipe and the optical fiber housing pipe are disposed concentrically with respect to the irradiation apparatus, and the mirror housing pipe is spirally rotated by a rotation driving device, and thereby, it becomes possible to perform a laser process on an inner surface of a pipe.

DETAILED DESCRIPTION

Figure 1A:
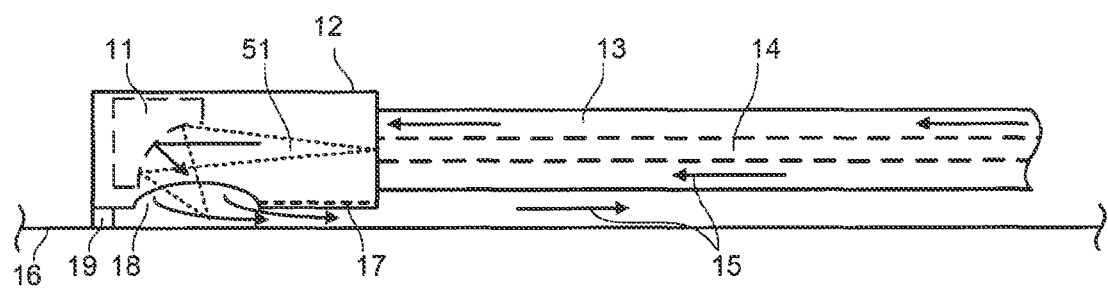
FIG. 1A and FIG. 1B are views schematically illustrating a configuration of a laser irradiation apparatus according to a first embodiment.

In the above-stated apparatus, it is necessary to constantly keep positions of an irradiation object portion and the aspherical mirror to perform the laser process by spirally moving the irradiation apparatus. Besides, the process is not enabled without setting a clearance between the irradiation apparatus and a processing object to be the one according to a focal length of the laser light.

The process can be performed if the clearance is set small, but there is a risk in which the irradiation apparatus interferes with an inner surface of the processing object to get out of order. On the other hand, if the clearance is set large, there is a possibility in which the process cannot be performed because the processing object is out of a focus tolerance range caused by vibration and so on at a rotation time.

The embodiment of the present invention is made to correspond to the above-stated conventional circumstances, and an object thereof is to provide a laser irradiation apparatus and a laser irradiation method capable of performing a laser process while keeping a distance with a processing object portion constant without incurring increasing in an interference possibility with an inner surface of the processing object.

An aspect of a laser irradiation apparatus according to the embodiment of the present invention includes: a laser light transmission mechanism guiding laser light from a laser light source and emitting it from a laser light emission part; a condensing mechanism condensing the laser light emitted from the laser light emission part; a pipe state casing housing and holding the condensing mechanism inside thereof and having an opening part to irradiate the laser light condensed by the condensing mechanism to a processing object; a fluid supply mechanism supplying a fluid from a fluid supply source into the casing and making it emit from the opening part; a positioning mechanism provided at the casing and keeping a distance from the condensing mechanism to the processing object constant by being brought into contact with the processing object; and a fluid guide mechanism guiding the fluid emitted from the opening part to flow between the casing and the processing object along an axial direction of the casing.

An aspect of a laser irradiation method according to the embodiment of the present invention includes: using a laser irradiation apparatus including: a laser light transmission mechanism guiding laser light from a laser light source and emitting it from a laser light emission part, a condensing mechanism condensing the laser light emitted from the laser light emission part, a pipe state casing housing and holding the condensing mechanism inside thereof and having an opening part to irradiate the laser light condensed by the condensing mechanism to a processing object, a fluid supply mechanism supplying a fluid from a fluid supply source into the casing and making it emit from the opening part, a positioning mechanism provided at the casing and keeping a distance from the condensing mechanism to the processing object constant by being brought into contact with the processing object, and a fluid guide mechanism guiding the fluid emitted from the opening part to flow between the casing and the processing object along an axial direction of the casing; and irradiating the laser light to the processing object under a state in which a flow of the fluid along the fluid guide mechanism is formed by emitting the fluid supplied from the fluid supply mechanism from the opening part of the casing.

Hereinafter, embodiments of a laser irradiation apparatus and a laser irradiation method according to the present invention are described with reference to the drawings.

Figure 1B:
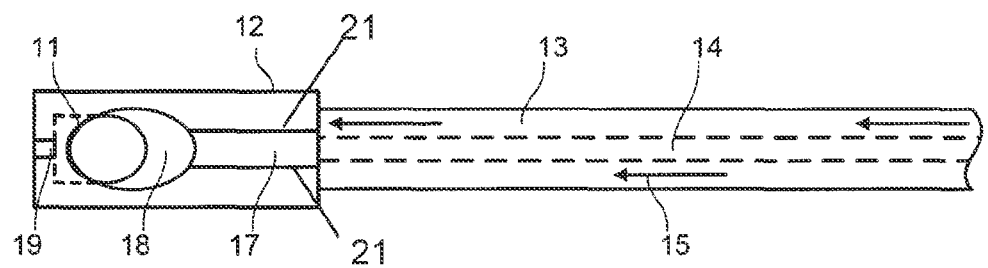

FIGS. 1A, 1B are views schematically illustrating a schematic configuration of a substantial part of an embodiment of a laser irradiation apparatus and a laser irradiation method according to one embodiment, in which FIG. 1A illustrates a configuration seen from a lateral side, and FIG. 1B illustrates a configuration seen from a lower surface side.

As illustrated in FIGS. 1A, 1B, a tip portion of an optical fiber 14 as a laser light transmission mechanism connected to a not-illustrated laser oscillator is connected to a casing 12 formed in a pipe state (a cylindrical state in the present embodiment). Besides, a tip of a fluid supply mechanism 13 in a pipe state connected to a not-illustrated fluid supply source is connected to the casing 12. An aspherical mirror 11 as a laser light reflecting and condensing mechanism is housed and held in the casing 12.

An opening 18 is formed at one surface of the casing 12. Besides, a positioning mechanism 19 is provided at a tip side than the opening 18 (left side in FIGS. 1A/1B), and a fluid guide mechanism 17 is provided at a rear end side than the opening 18 (right side in FIGS. 1A/1B) at an outside portion of the surface of the casing 12 where the opening 18 is formed.

The fluid guide mechanism 17 is to guide a fluid 15 (illustrated by arrows in the drawing) emitted from the opening 18 to flow along an axial direction of the casing 12 between the casing 12 and a processing object, and to generate an ejector effect between the casing 12 and the processing object. In the present embodiment, the fluid guide mechanism 17 is constituted by a groove formed along the axial direction (longitudinal direction) of the casing 12. However, the fluid guide mechanism 17 is not limited to the groove as long as it is capable of guiding the flow of the fluid 15 and generating the ejector effect. For example, the fluid guide mechanism 17 may be constituted by plural weirs 21 formed to be in parallel along the axial direction of the casing 12.

In the laser irradiation apparatus having the above-stated configuration, a laser light 51 irradiated from a not-illustrated laser oscillator is transmitted by the optical fiber 14. The laser light 51 irradiated from a laser light emission part at an end portion of the optical fiber 14 is reflected and condensed at the aspherical mirror 11, and irradiated to a surface of a processing object 16 through the opening 18.

As stated above, the optical fiber 14 is generally used as the laser light transmission mechanism, and an angle of divergence of the laser light 51 irradiated from the optical fiber end portion (laser light emission part) is defined by a kind of the used optical fiber 14. For example, when the optical fiber 14 of which material is quartz and core diameter is ϕ1.0 [mm] is used, a numerical aperture (NA) is generally approximately 0.2. A size of the aspherical mirror 11 as the laser light reflecting and condensing mechanism, a distance from the optical fiber end portion (laser light emission part) to the aspherical mirror 11, and a distance from the aspherical mirror 11 to a processing object surface of the processing object 16 are determined in accordance with the numerical aperture NA of the laser light 51 irradiated from an end face of the optical fiber.

Figure 2:
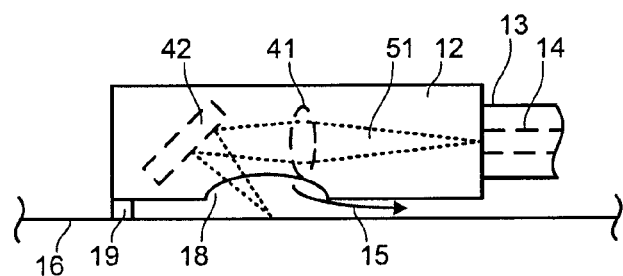
FIG. 2 is a view illustrating a configuration of another example of a laser light reflecting and condensing mechanism.

It is preferable to use the aspherical mirror 11 as the laser light reflecting and condensing mechanism as stated above. However, as illustrated in FIG. 2, it may have a constitution in which a laser light condensing mechanism (lens or the like) 41 and a laser light reflection mechanism (mirror or the like) 42 are combined. When the aspherical mirror 11 is used, it is preferable to use a metal such as copper, a glass such as quartz, BK7, and so on as a material, a reflective film to reflect certain laser light is provided at a surface of the aspherical mirror 11, and thereby, a damage to the aspherical mirror 11 by the laser light is reduced, and an operation life can be made longer.

Besides, a condenser lens made of the glass such as quartz, BK7 and so on can be used as the laser light condensing mechanism 41. Besides, a reflection mirror made of the metal such as copper and so on, a reflection mirror made of the glass such as quartz, BK7 and so on are preferable to be used as the laser light reflection mechanism 42. Besides, the condenser lens having an antireflection film transmitting laser light with a certain wavelength is used according to need, and thereby, it becomes possible to prevent a damage of the optical fiber caused by the reflected light. Further, the reflection mirror having the reflective film reflecting the laser light with a certain wavelength is used, and thereby, it becomes possible to reduce damage for a mirror main body, and to make the operation life of the mirror longer.

The aspherical mirror 11 as the laser light reflecting and condensing mechanism is provided in the casing 12, and held by the casing 12. Besides, the optical fiber 14 as the laser light transmission mechanism is provided and held in the tubular fluid supply mechanism 13. However, it may be constituted such that the optical fiber 14 is also held in the casing 12. As the casing 12, it is preferable to be a cylindrical shape, but it may be a spindle shape, a polygonal shape, and so on. Besides, the casing 12 may have a size as long as the processing object 16 can enter into the pipe when the processing object 16 is in a pipe state and the process is performed for the inner surface thereof.

As illustrated in FIG. 1A and FIG. 1B, not only the laser light 51 but also the fluid 15 supplied from the fluid supply mechanism 13 are emitted from the opening 18. The fluid 15 flows from the right side in FIGS. 1A, 1B toward the casing 12 in the fluid supply mechanism 13, and changes a flowing direction toward downward in FIG. 1A by running against the aspherical mirror 11, and is emitted from the opening 18. The fluid 15 emitted from the opening 18 diffuses toward outside of the casing 12, but the flow of the fluid 15 is guided by the fluid guide mechanism 17, and flows along the longitudinal direction (axial direction) of the casing 12 between the casing 12 and the processing object 16.

The fluid 15 flows between the casing 12 and the processing object 16 as stated above, and thereby, a pressure difference is generated between an area between the casing 12 and the processing object 16 and a peripheral area, and the casing 12 is attracted to the processing object 16 by the ejector effect. The positioning mechanism 19 provided at the tip side of the casing 12 is brought into contact with the processing object 16, and the distance between the casing 12 and the processing object 16, namely, the distance between the aspherical mirror 11 and the processing object 16 is kept constant.

Note that when laser peening is performed, it is preferable to use a liquid such as water and so on, when laser welding is performed, it is preferable to use inert gas such as Ar, $N_2$ and so on, and when laser cutting is performed, it is preferable to use combustion supporting gas such as oxygen and air and so on, as the fluid 15.

When it is constituted to attract the casing 12 to the processing object 16 by using the ejector effect, it is preferable to constitute the fluid supply mechanism 13 with a material having flexibility, for example, such as a polymer, an engineering plastic, a hard rubber, a glass and so on to be capable of being bent so that the fluid supply mechanism 13 follows a movement of the casing 12. Specifically, polyvinyl chloride, polystyrene, an ABS resin, an AES resin, polyethylene, polypropylene, polyamide (nylon), polycarbonate, polyacetal, PTFE, a peek material, ebonite, a float glass, fused quartz, and so on can be cited, but it is not limited thereto as long as it is a material capable of following the movement of the casing 12 by the ejector effect and the fluid 15 can be let flow inside thereof when the fluid supply mechanism 13 is processed into a pipe state.

Figure 3:
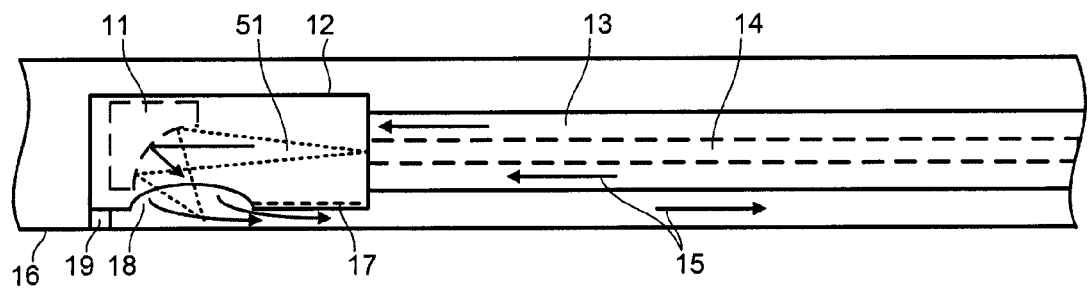
FIG. 3 is a view to describe an application method of laser irradiation for an inner surface of a pipe.

FIG. 3 illustrates an example in which the laser peening is performed for an inner surface of the processing object 16 made up of a pipe state member by using the laser irradiation apparatus according to the present embodiment. In case of the laser peening, the laser light 51 is irradiated from the opening 18, and the water is emitted as the fluid 15 from the opening 18 as illustrated in FIG. 3.

As an example, an experiment was performed by using the laser irradiation apparatus of which inside diameter of a pipe is φ10.0 [mm], and an outside diameter of the casing 12 is φ9.0 [mm]. In this case, the water was emitted from the opening 18 of the casing 12 with a flow rate of 1.5 [l/min] to 12.0 [l/min], and thereby, the laser irradiation apparatus constituted by the casing 12 and so on was able to be attracted to the inner surface of the processing object 16 by the ejector effect, and it was possible to keep the distance between the inner surface of the processing object 16 and the casing 12 (aspherical mirror 11) constant.

Besides, when the inside diameter of the pipe is φ15.0 [mm], and the outside diameter of the casing 12 is φ14.5 [mm], it was verified that suction by the ejector effect was enabled when the water was emitted from the opening 18 of the casing 12 with the flow rate of 4.5 [l/min] to 16.0 [l/min]. As described above, it is possible to positioning the casing 12 of the laser irradiation apparatus by changing a shape and size of the casing 12 of the laser irradiation apparatus and the flow rate of the fluid 15 emitted from the opening 18 in accordance with a shape and size of the processing object owing to the ejector effect.

When the laser light 51 is irradiated to the processing object 16 simultaneously with the water flow from the opening 18 of the casing 12, the casing 12 is attracted to the processing object 16 by the ejector effect because the laser light 51 is the light and a reaction force does not occur. It is thereby possible to carry out an application such as the laser peening while keeping a constant distance with the processing object 16 in any posture of up, down, right and left without being affected by gravity. Note that in the example illustrated in FIG. 3, a case is described when the laser irradiation is performed for the inner surface of the member in the pipe state, but the processing object is not limited to the one in the pipe state but may be in a planer state. The casing 12 is attracted to the processing object 16 and the distance between the casing 12 and the processing object 16 is kept constant even in a case when the laser irradiation is performed for the processing object in the planer state as long as they are in a positional relationship capable of being attracted by the ejector effect.

Note that the case when the laser peening is performed is described in the above-stated description, but it is possible to apply for the laser welding by processing under, for example, the following conditions by using a YAG laser or a fiber laser as a light source.

Laser oscillator: YAG laser oscillator or fiber laser oscillator
Laser output: 2.0 [kW]
Spot diameter: φ0.2 [mm]
Application speed: 1.0 [m/min]
Fluid: nitrogen, argon
Flow rate: 30 [l/min]

For example, when the welding of a stainless-steel pipe of which inside diameter was 30 [mm], sheet thickness was 3 [mm] was performed, the laser irradiation was performed with the above-stated conditions, the welding was performed while flowing Ar gas with the flow rate of 30 [l/min] and rotating the laser irradiation apparatus in a circumferential direction, and thereby, it was possible to perform keyhole welding from the inner surface of the pipe. In this case, the flow rate of the fluid 15 was the flow rate required for obtaining the ejector effect, and therefore, it was possible to keep the distance between the casing 12 of the laser irradiation apparatus and the processing object 16 constant and to perform good laser welding.

Here, the position of the end face of the optical fiber 14 as the laser light transmission mechanism is gradually getting off from the ashperical mirror 11 as the laser light reflecting and condensing mechanism, and it changes from the keyhole welding to a heat conduction type weld bead shape. As stated above, a mechanism changing a distance from the aspherical mirror 11 by moving the position of the end face of the optical fiber 14 is held, and thereby, it becomes possible to obtain a necessary weld bead shape.

Besides, the laser oscillator used for the above-stated welding is used, and the process is performed under, for example, the following conditions, and thereby, the laser cutting can also be performed.

Laser oscillator: YAG laser oscillator or fiber laser oscillator
Laser output: 2.0 [kW]
Spot diameter: φ0.3 [mm]
Application speed: 1.0 [m/min]
Fluid: air
Flow rate: 50 [l/min]

The laser cutting is attained by blowing off the locally molten metal by a fluid (assist gas) while using the laser light as a heat source. Compressed air is used as the assist gas, and thereby, an effective cutting is enabled by accelerating the melting of the processing object by oxygen, and blowing off the molten metal by a pressure of nitrogen and so on other than oxygen. In case of the cutting of an inner surface of a pipe, the casing 12 is moved in a circumferential direction of the pipe, and thereby, it is possible to cut the pipe while making the casing 12 of the laser irradiation apparatus follow the inner surface of a pipe. Besides, nitrogen is used as the fluid, and thereby, it is possible to cut without oxidizing the cut surface.

Besides, the laser welding or the laser cutting is performed by using nitrogen gas, and thereby, it is possible to form a nitride because the metal molten by the laser irradiation and nitrogen react. For example, the laser molding is performed in a mode forming a heat conductive molten pool at a surface of a Ti alloy, and thereby, a TiN layer and a TiAlN layer are formed at the surface during a cooling process. A nitride layer is formed at the surface, and thereby, corrosion resistance of the surface improves, and an effect in which the operation life is made longer can be obtained depending on a member to be applied. In addition, AlN is formed by an Al alloy, and an $Al_2O_3$ layer can be formed by using oxygen and air as the fluid.

Figure 4:
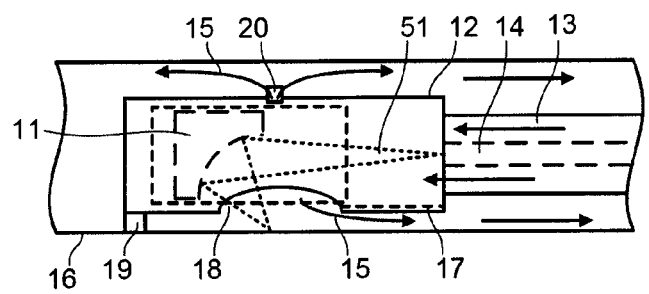
FIG. 4 is a view schematically illustrating a configuration of a laser irradiation apparatus according to a second embodiment.

Next, a second embodiment is described with reference to FIG. 4. Note that the same reference numerals are used for parts corresponding to the laser irradiation apparatus illustrated in FIGS. 1A, 1B, and redundant descriptions are not given. In a laser irradiation apparatus according to the second embodiment, an exhaust nozzle 20 to emit the fluid 15 toward outside is provided at a position opposed to the opening 18 of the casing 12.

In the laser irradiation apparatus of the second embodiment constituted as stated above, the casing 12 constituting a laser irradiation head is disposed in the pipe state processing object 16, and the fluid 15 supplied from the fluid supply mechanism 13 to the casing 12 is emitted from the opening 18 and it is also emitted from the exhaust nozzle 20 when the laser irradiation is performed for the inner surface of the processing object 16.

The fluid 15 emitted from the opening 18 is guided by the guide mechanism 17, and flows along the longitudinal direction (axial direction) of the casing 12 between the casing 12 and the processing object 16. The pressure difference is thereby generated between an area between the casing 12 and the processing object 16 and a peripheral area, then the casing 12 is attracted to the processing object 16 by the ejector effect, and the positioning mechanism 19 provided at the tip side of the casing 12 is brought into contact with the processing object 16.

In addition, a force pressing the casing 12 toward the opening 18 side (lower side in FIG. 4) acts by the fluid 15 emitted from the exhaust nozzle 20 toward an inner wall of the processing object 16. The distance between the casing 12 and the processing object 16, namely, the distance between the aspherical mirror 11 and the processing object 16 is more stably kept constant by the pressing force and a sucking force by the above-stated ejector effect. Note that it is possible to perform a stable positioning by adjusting a size of the exhaust nozzle 20, the distance between the casing 12 and the processing object 16, and the flow rate of the fluid 15.

Figure 5:
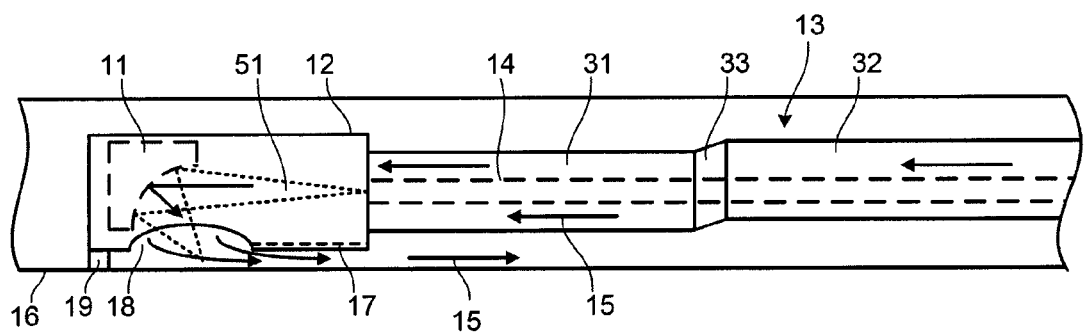
FIG. 5 is a view schematically illustrating a configuration of a laser irradiation apparatus according to a third embodiment.

Next, a third embodiment is described with reference to FIG. 5. Note that the same reference numerals are used for parts corresponding to the laser irradiation apparatus illustrated in FIGS. 1A, 1B, and redundant descriptions are not given. As illustrated in FIG. 5, in the laser irradiation apparatus according to the third embodiment, the fluid supply mechanism 13 has a configuration including a first fluid supply mechanism 31, a second fluid supply mechanism 32 and a connecting mechanism 33 connecting them. The connecting mechanism 33 is capable of being bent, and it is constituted by a tubular member with an elasticated material such as a bellows structure or a rubber.

The fluid 15 flows as illustrated by arrows in the drawing, and therefore, an attraction force is generated between the casing 12 and the processing object 16 by the ejector effect. On the other hand, when a material with stiffness such as a stainless-steel pipe is used as the member constituting the fluid supply mechanism 13, it is conceivable in which there are cases when required specifications are not satisfied such that the movement of the casing 12 may not enough follow for the attraction force, and the laser processing posture cannot be taken because the casing 12 is not in parallel to the processing object 16 even if the casing 12 is attracted.

In the third embodiment, the fluid supply mechanism 13 is therefore made to be the configuration including the first fluid supply mechanism 31, the second fluid supply mechanism 32, and the bendable connection mechanism 33 connecting these. It is thereby possible to keep the posture in which the casing 12 is horizontal to the processing object 16 in accordance with the attraction force obtained by the ejector effect because the connecting mechanism 33 bends even when the first fluid supply mechanism 31 and the second fluid supply mechanism 32 are constituted by the material with high stiffness such as the stainless-steel pipe.

Figure 6:
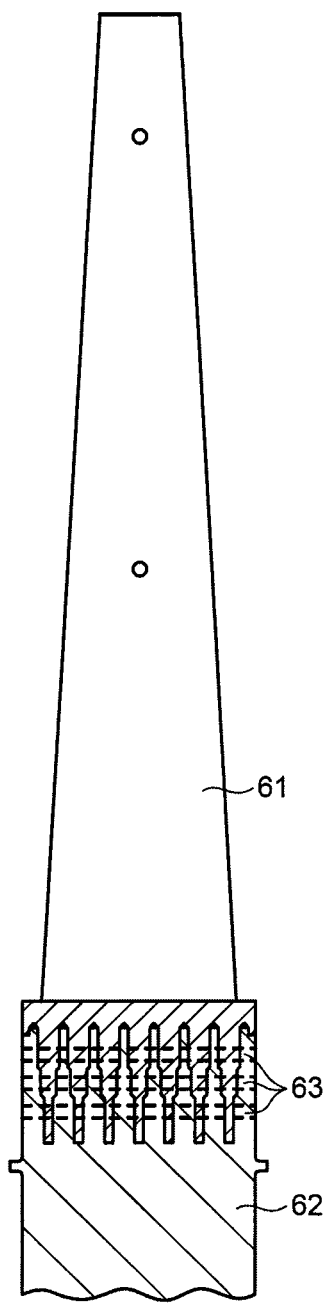
FIG. 6 is a view illustrating a configuration of a low-pressure turbine blade.

Next, a case when the laser peening is performed for a low-pressure turbine blade having a fork state implanted part and inside of a pin hole of a disk is described with reference to FIGS. 6, 7. FIG. 6 is a view illustrating a configuration of the low-pressure turbine blade having the fork state implanted part. A low-pressure turbine blade 61 having the fork state implanted part has a structure inserted into a fork of a disk 62, and fixed by pins 63.

As for materials, for example, 12Cr steel, a titanium alloy can be used as the material of the low-pressure turbine blade 61, 3.5% NiCrMoV steel can be used as the material of the disk 62, and 5CrMoV steel can be used as the material of the pin 63. A tolerance of 0.2% to 0.6% relative to a pin diameter is desirable as the tolerance between the pin 63 and the pin hole, but they are not limited thereto.

The low-pressure turbine blade 61 receives a centrifugal force in an axial direction during operation. Accordingly, a coupling part between the low-pressure turbine blade 61 and the disk 62 of which stress concentration is high has to have a structure having enough strength relative to a low cycle fatigue according to starting and stopping, and a high cycle fatigue under high mean stress and a corrosive environment.

Figure 7:
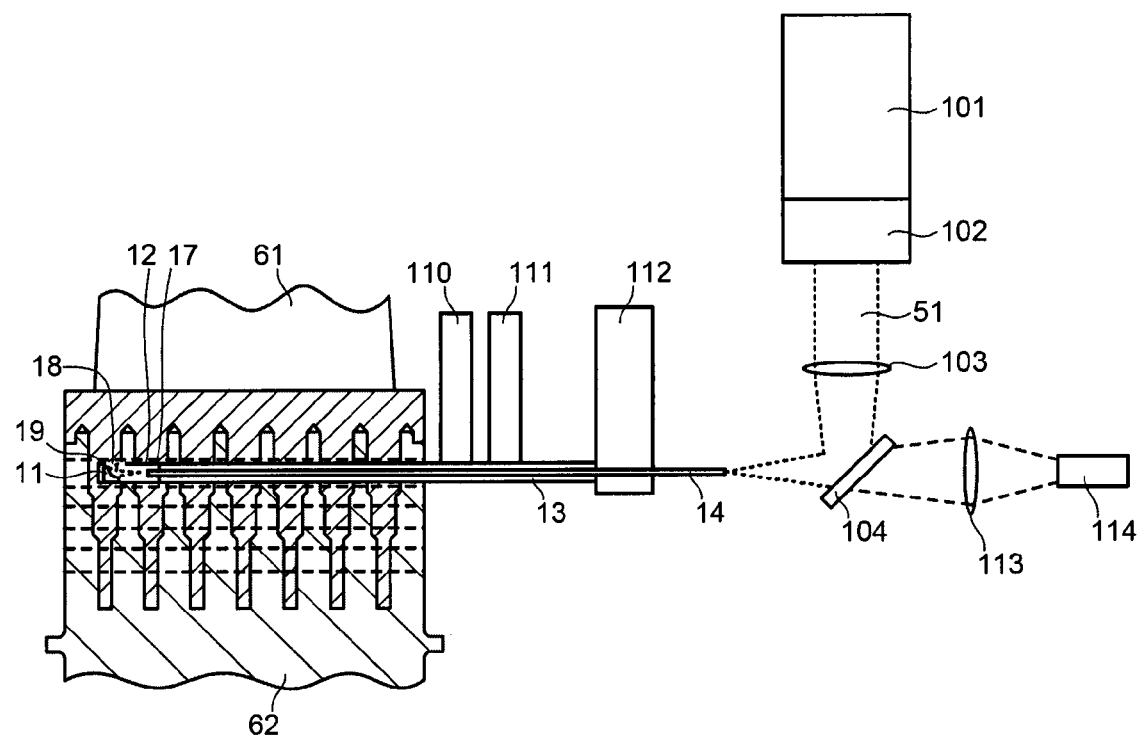
FIG. 7 is a view to describe an application method of laser irradiation for a pinhole of the low-pressure turbine blade.

FIG. 7 is a view schematically illustrating a constitution when the laser peening application is performed for a pin hole surface of the low-pressure turbine blade 61 by using the laser irradiation apparatus. The laser light 51 irradiated from a laser oscillator 101 is adjusted to be a state capable of being incident and transmitted to the optical fiber at a laser light adjusting mechanism 102, and is incident on the optical fiber 14 as the laser light transmission mechanism via a condenser lens 103 and a reflection mirror 104. The laser light 51 incident on the optical fiber 14 is reflected and condensed by the aspherical mirror 11 as the laser light reflecting and condensing mechanism fixed in the casing 12, and irradiated to the pin hole surface of the low-pressure turbine blade 61. As the laser oscillator 101, a giant pulse YAG laser oscillator can be suitably used, but the other laser oscillators may be used as long as a laser oscillator capable of generating energy in which plasma is generated when a pulse laser is irradiated.

The casing 12 in which the aspherical mirror 11 is fixed therein and the opening 18 is held is connected to an axial direction moving mechanism 112 and a rotation mechanism 111 via the fluid supply mechanism 13. Besides, a liquid feed mechanism 110 is connected to the fluid supply mechanism 13. The laser light 51 irradiated from the aspherical mirror 11 to the inner surface of the pin hole is able to be irradiated to a desired area of the inner surface of the pin hole by rotating and moving the casing 12 by using the rotation mechanism 111 and the axial direction moving mechanism 112.

At the laser irradiation time, the fluid 15 supplied from the liquid feed mechanism 110 to the fluid supply mechanism 13 is emitted toward the inner surface of the pin hole via the opening 18 of the casing 12. The fluid 15 emitted to the inner surface of the pin hole is guided by the fluid guide mechanism 17 provided at the casing 12, and flows along the longitudinal direction (axial direction) of the casing 12. The casing 12 receives the ejector effect by the flow of the fluid 15, and is attracted to the inner surface of the pin hole. Accordingly, it becomes possible to keep a distance between the casing 12 (the aspherical mirror 11) and the inner surface of the pin hole constant by keeping the flow rate of the fluid 15 constant.

When the laser light 51 is scanned and irradiated to the inner surface of the pin hole, it is possible to irradiate the laser light 51 to the inner surface of the pin hole so as to draw a trajectory in a spiral state by, for example, simultaneously driving the axial direction moving mechanism 112 and the rotation mechanism 111. Besides, the laser light 51 is irradiated while driving only one drive mechanism of either the axial direction moving mechanism 112 or the rotation mechanism 111, and it is processed for a required certain distance, for example, for a length of a pin hole fork, or for one cycle of the pin hole. After that, the other drive mechanism is driven to move an irradiation position of the laser light 51 for a certain distance, then the similar operations are repeated, and thereby, the scanning and the irradiation of the laser light 51 to the inner surface of the pin hole can be performed.

Water is used as the fluid 15 fed from the liquid feed mechanism 110, and thereby, it is possible to irradiate the laser light 51 while cleaning in a vicinity of a laser light irradiation position in the pin hole. Besides, for example, an alkaline liquid such as ionized alkaline water and ammonia water is used as the fluid 15 fed from the liquid feed mechanism 110, and thereby, it is possible to prevent that rust is generated at the low-pressure turbine blade 61 and the disk 62.

A mirror in which a coating reflecting the laser light is performed at a surface is used as the reflection mirror 104 reflecting the laser light 51 emitted from the laser oscillator 101 to let it incident on the optical fiber 14, and thereby, it is possible to let the a major part of energy of the laser light 51 emitted from the laser oscillator 101 incident on the optical fiber 14. However, it is possible to adjust the energy of the laser light 51 which is incident on the optical fiber 14 by changing a kind of the coating and, for example, using a mirror performing a coating transmitting the laser light 51 for a several percent. For example, when an output of the laser light 51 is 100 [mJ/pulse], the reflection mirror 104 to which a coating reflecting 99% and transmitting 1% is performed is used, and thereby, 99 [mJ/pulse] is incident on the optical fiber 14 and 1 [mJ/pulse] is transmitted.

The laser light 51 incident into the optical fiber 14 is propagated in the optical fiber 14, and emitted from an emission end, but actually, the laser light 51 is reflected at an incident end face of the optical fiber 14, and therefore, it is not propagated for 100%. For example, it is known that the laser light is reflected for approximately 3.5% at an end face of the quartz optical fiber 14. When the coating is intentionally performed for the reflection mirror 104 to transmit the laser light for a several percent, a part of the laser light 51 reflected at the end face of the optical fiber 14 is transmitted through the reflection mirror 104 and passes toward a rear surface.

Here, it becomes possible to observe a state of the laser light reflected from the end face of the optical fiber 14 by constituting such that the laser light 51 passing through the optical fiber 14 and the reflection mirror 104 is taken into an image data collection mechanism 114 via a condenser lens 113. A camera capable of obtaining video information such as a CCD camera may be used as the image data collection mechanism 114. Besides, it becomes possible to verify a state at the emission end of the optical fiber 14 by obtaining an image data in which a time required for the laser light 51 to propagate inside the optical fiber 14 is added by a time resolution function if a gate ICCD camera is used. It is possible to obtain information relating to states of the optical fiber 14 and the laser light 51 during the laser irradiation in real time and to verify soundness of the device by making use of the functions as stated above.

The laser peening is performed for the inner surface of the pin hole of the low-pressure turbine blade having the fork state implanted part by using the laser irradiation apparatus, and thereby, it is possible to enable a state in which a compressive residual stress of approximately 0.1 [mm] to 2.0 [mm] is applied from a surface layer in a depth direction, a tensile residual stress applied for the inner surface of the pin hole at the operation time is suppressed, and occurrence of stress-corrosion cracking can be suppressed.

Figure 8A:
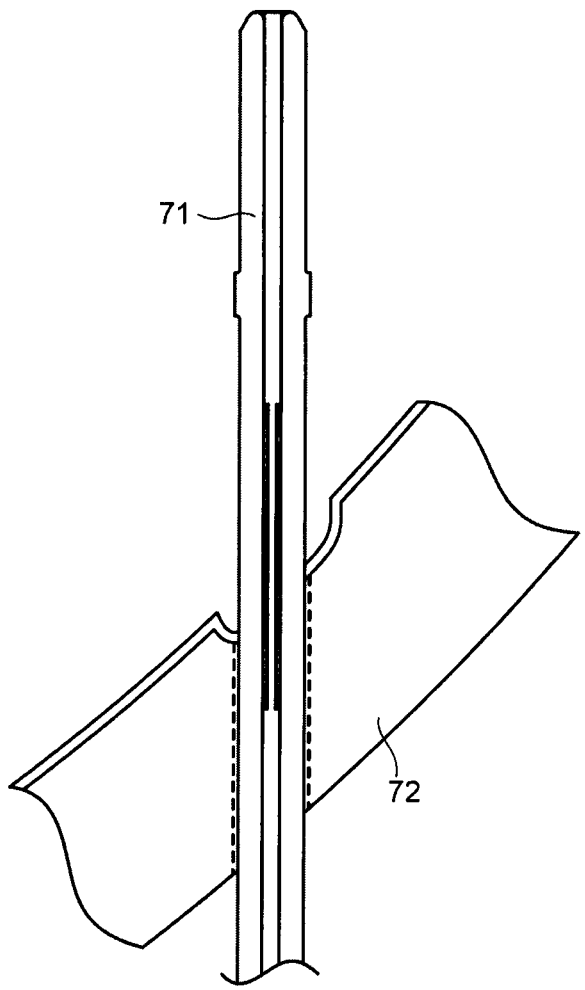
FIG. 8A and FIG. 8B are views to describe an application method of laser irradiation for an in-core instrumentation pipe of PWR.
Figure 8B:
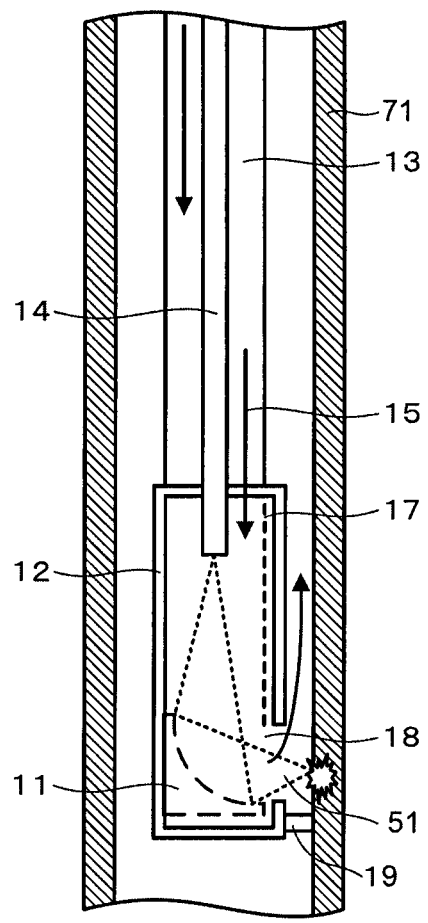

Next, a case when the laser peening is performed for an inner surface of an in-core instrumentation pipe (BMI: Bottom Mounted Instruments) of a PWR plant by using the laser irradiation apparatus is described with reference to FIGS. 8A, 8B. FIG. 8A is a view schematically illustrating a configuration of an in-core instrumentation pipe (BMI: Bottom Mounted Instruments) 71 having a pipe shape and is provided to penetrate a furnace bottom part 72 of the PWR plant. When the laser peening is performed for the inner surface of the in-core instrumentation pipe 71 as stated above, the casing (irradiation head) 12 housing the aspherical mirror 11 inside thereof is disposed in the in-core instrumentation pipe 71 as illustrated in FIG. 8B. The laser light transmitted by the optical fiber 14 is reflected and condensed by the aspherical mirror 11, and irradiated to the inner surface of the in-core instrumentation pipe 71.

Besides, the fluid 15 such as water supplied into the casing 12 by the fluid supply mechanism 13 is emitted from the opening 18 provided at the casing 12. The fluid 15 emitted between the casing 12 and the inner surface of the in-core instrumentation pipe 71 is guided by the fluid guide mechanism 17 provided at the casing 12, and flows along the longitudinal direction (axial direction) of the casing 12. The casing 12 receives the ejector effect by the flow of the fluid 15, and is attracted to the inner surface of the in-core instrumentation pipe 71. Accordingly, it becomes possible to keep a distance between the casing 12 (aspherical mirror 11) and the inner surface of the in-core instrumentation pipe 71 constant by keeping the flow rate of the fluid 15 constant.

According to the above-stated embodiment, it is possible to provide a laser irradiation apparatus and a laser irradiation method capable of performing a laser process while keeping a distance with a processing object constant without incurring an increase of an interference possibility with an inner surface of the processing object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A laser peening apparatus, comprising:
   a laser light transmission mechanism configured to guide laser light from a laser light source to emit the laser light from a laser light emission part;
   a condensing mechanism configured to condense the laser light emitted from the laser light emission part;
   a pipe shaped casing configured to house and hold the condensing mechanism inside thereof and have an opening part to irradiate the laser light condensed by the condensing mechanism to a processing object;
   a fluid supply mechanism configured to supply a liquid fluid from a fluid supply source into the casing to emit the liquid fluid from the opening part;
   a positioning mechanism provided at the casing to keep a distance from the condensing mechanism to the processing object constant by being brought into contact with the processing object; and
   a fluid guide mechanism configured to guide the liquid fluid emitted from the opening part to generate a flow of the liquid fluid along an axial direction of the casing between an outer surface of the casing and the processing object so as to create attraction therebetween.

2. The laser peening apparatus according to claim 1, wherein the fluid guide mechanism comprises a groove provided on the outer surface of the casing or plural weirs provided on the casing with an interval to be in parallel.

3. The laser peening apparatus according to claim 1, further comprising
an emission nozzle to emit the liquid fluid supplied by the fluid supply source at an opposite side from the opening part of the casing.

4. The laser peening apparatus according to claim 1, wherein a position of the laser light emission part with respect to the condensing mechanism is made changeable in the laser light transmission mechanism.

5. The laser peening apparatus according to claim 1, wherein the fluid supply mechanism is configured to supply the liquid fluid through a tubular body capable of being bent.

6. The laser peening apparatus according to claim 1, wherein the fluid supply mechanism comprises:
  a first annular member configured to pass the liquid fluid through inside;
  a second annular member configured to pass the liquid fluid through inside; and
  a connection mechanism to connect the first annular member and the second annular member.

7. The laser peening apparatus according to claim 1, further comprising:
a mechanism provided in front of the laser light transmission mechanism to monitor reflected light transmitted via the laser light transmission mechanism.

8. A laser peening method, comprising:
preparing a laser irradiation apparatus including:
  a laser light transmission mechanism configured to guide laser light from a laser light source to emit the laser light from a laser light emission part;
  a condensing mechanism configured to condense the laser light emitted from the laser light emission part;
  a pipe shaped casing configured to house and hold the condensing mechanism inside thereof and have an opening part to irradiate the laser light condensed by the condensing mechanism to a processing object;
  a fluid supply mechanism configured to supply a liquid fluid from a fluid supply source into the casing to emit the liquid fluid from the opening part;
  a positioning mechanism provided at the casing to keep a distance from the condensing mechanism to the processing object constant by being brought into contact with the processing object; and
  a fluid guide mechanism configured to guide the liquid fluid emitted from the opening part to flow between an outer surface of the casing and the processing object along an axial direction of the casing;
emitting the liquid fluid supplied from the fluid supply mechanism through the opening part of the casing so as to generate a flow of the liquid fluid along the fluid guide mechanism to create attraction between the outer surface of the casing and the processing object; and
irradiating the laser light to the processing object under a state of forming the flow of the liquid fluid.

9. A laser irradiation apparatus, comprising:
a laser light transmission mechanism configured to guide laser light from a laser light source to emit the laser light from a laser light emission part;
a condensing mechanism configured to condense the laser light emitted from the laser light emission part;
a pipe shaped casing configured to house and hold the condensing mechanism inside thereof and have an opening part to irradiate the laser light condensed by the condensing mechanism to a processing object;
a fluid supply mechanism configured to supply a fluid from a fluid supply source into the casing to emit the fluid from the opening part;
a positioning mechanism provided at the casing to keep a distance from the condensing mechanism to the processing object constant by being brought into contact with the processing object;
a fluid guide mechanism configured to guide the fluid emitted from the opening part to flow between the casing and the processing object along an axial direction of the casing; and
an emission nozzle disposed on the casing at an opposite side from the opening part thereof to emit the fluid supplied by the fluid supply source.

* * * * *